(12) United States Patent
Aruga et al.

(10) Patent No.: US 9,760,332 B2
(45) Date of Patent: Sep. 12, 2017

(54) PROJECTION TYPE DISPLAY DEVICE, DISPLAY SYSTEM, AND DISPLAY METHOD

(71) Applicant: SEIKO EPSON CORPORATION, Tokyo (JP)

(72) Inventors: Tadanori Aruga, Torrance, CA (US); Yutaka Yasuda, Matsumoto (JP); Toru Katahira, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/384,719

(22) Filed: Dec. 20, 2016

(65) Prior Publication Data

US 2017/0102908 A1 Apr. 13, 2017

Related U.S. Application Data

(62) Division of application No. 13/746,966, filed on Jan. 22, 2013, now abandoned.

(30) Foreign Application Priority Data

Mar. 29, 2012 (JP) .................................. 2012-075872

(51) Int. Cl.
*G09G 5/00* (2006.01)
*G06F 3/14* (2006.01)

(52) U.S. Cl.
CPC .......... *G06F 3/1423* (2013.01); *G09G 5/006* (2013.01); *G09G 2320/103* (2013.01); *G09G 2370/04* (2013.01)

(58) Field of Classification Search
None
See application file for complete search history.

(56) References Cited

U.S. PATENT DOCUMENTS

| 5,136,397 A | 8/1992 | Miyashita |
| 6,698,898 B2 | 3/2004 | Terami et al. |
| 7,059,722 B2 | 6/2006 | Matoba et al. |

(Continued)

FOREIGN PATENT DOCUMENTS

| JP | 2002-287242 A | 10/2002 |
| JP | 2003-152375 A | 5/2003 |

(Continued)

OTHER PUBLICATIONS

Oct. 6, 2015 Office Action issued in U.S. Appl. No. 13/746,966.
Feb. 18, 2015 Office Action issued in U.S. Appl. No. 13/746,966.

*Primary Examiner* — Christopher R Lamb
(74) *Attorney, Agent, or Firm* — Oliff PLC

(57) ABSTRACT

A system displays an image using a plurality of projection type display devices, and is capable of reliably notifying a user who uses the system that an error has occurred in a certain projection type display device. A slave includes a display unit that projects and displays an image and a signal receiving unit that receives data transmitted from a commander. The slave includes a detection unit that detects an error in the commander on the basis of the receiving conditions of the data in the signal receiving unit. The slave includes a display control unit that, when an error is detected by the detection unit, makes the display unit display an image showing that the error has been detected.

17 Claims, 9 Drawing Sheets

(56) References Cited

U.S. PATENT DOCUMENTS

| | | | |
|---|---|---|---|
| 2002/0116143 A1* | 8/2002 | Lalau | G01K 7/42 702/130 |
| 2002/0159035 A1 | 10/2002 | Koyama et al. | |
| 2005/0219467 A1* | 10/2005 | Nomizo | G03B 21/26 353/30 |
| 2008/0018257 A1* | 1/2008 | Beasley | G03B 21/16 315/112 |
| 2008/0151127 A1 | 6/2008 | Ryou | |
| 2011/0175895 A1* | 7/2011 | Hayakawa | G09G 3/3655 345/212 |
| 2011/0292080 A1* | 12/2011 | Oka | H04N 9/3179 345/634 |

FOREIGN PATENT DOCUMENTS

| | | |
|---|---|---|
| JP | 2004-013632 A | 1/2004 |
| JP | 2006-350359 A | 12/2006 |
| JP | 2011-248078 A | 12/2011 |
| JP | 2012-019442 A | 1/2012 |

\* cited by examiner

PROJECTION TYPE DISPLAY DEVICE, DISPLAY SYSTEM, AND DISPLAY METHOD

CROSS-REFERENCE TO RELATED APPLICATION

This application is a divisional of U.S. application Ser. No. 13/746,966 filed Jan. 22, 2013, which is based on and claims priority under 35 U.S.C. 119 from Japanese Patent Application No. 2012-075872 filed on Mar. 29, 2012.

BACKGROUND

1. Technical Field

The present invention relates to a technique for notifying a user that an error has occurred in a system that displays an image using a plurality of projection type display devices.

2. Related Art

There is a technique for notifying a user that an error has occurred in a projection type display device (so-called projector) that projects an image and displays the image on a screen or the like. JP-A-2004-13632 discloses a technique for sending an e-mail for the notification of a malfunction place to a system administrator or the like when an error is observed in the projector.

Meanwhile, there is a method called "stack" in which one image is displayed more brightly than when one projection type display device is used by overlapping images displayed by a plurality of projection type display devices. When displaying an image using this method, even if an error occurs in a certain projection type display device and accordingly a corresponding image is no longer displayed, the user may not notice the occurrence of an error since the brightness of the displayed image is only reduced. In this case, even if the projection type display device notifies the user of the occurrence of an error by turning on an LED (Light Emitting Diode), the user may not recognize the occurrence of the error if the user does not know the meaning of the LED lighting. In addition, in the technique disclosed in JP-A-2004-13632, a user to whom an e-mail is to be sent should stay at that location. In addition, in this technique, it is not possible to recognize the occurrence of an error unless the user has a device that displays an e-mail and notices the arrival of the e-mail.

SUMMARY

An advantage of some aspects of the invention is to reliably notify a user, who uses a system that displays an image using a plurality of projection type display devices, that an error has occurred in a certain projection type display device.

An aspect of the invention is directed to a projection type display device including: a first display unit that projects and displays an image; a first signal receiving unit that receives transmission data transmitted from another projection type display device that projects and displays an image; a first detection unit that detects an error in the other projection type display device on the basis of receiving conditions of the transmission data in the first signal receiving unit; and a first display control unit that, when the error is detected by the first detection unit, makes the first display unit display a first image showing that the error has been detected.

According to the aspect of the invention, even when an error occurs in a certain projection type display device and accordingly it is not possible to display an image, it is possible to reliably notify a user, who uses a system that displays an image using a plurality of projection type display devices, that an error has occurred using an image displayed by the host device in which no error has occurred.

In a preferable aspect of the invention, when an error occurs, the other projection type display device transmits, as the transmission data, error data indicating that the error has occurred, and the first detection unit detects the error when the first signal receiving unit receives the error data.

According to this aspect of the invention, since an error is detected on the basis of communication performed when the error occurs, it is possible to notify the user that the error has occurred earlier than when an error is detected on the basis of communication performed at a timing that is not relevant to the occurrence of the error.

In another preferable aspect of the invention, the other projection type display device transmits first data to the first signal receiving unit as the transmission data at a first timing, and the first detection unit detects the error when the first signal receiving unit does not receive the first data at a second timing corresponding to the first timing.

According to this aspect of the invention, even when the other projection type display device cannot transmit data, it is possible to notify the user that the error has occurred.

In still another preferable aspect of the invention, the projection type display device further includes a first signal transmission unit that transmits second data to the other projection type display device at a third timing, the other projection type display device transmits third data to the first signal transmission unit as the transmission data in response to the reception of the second data transmitted from the first signal transmission unit, and the first detection unit detects the error when the first signal receiving unit does not receive the third data at a fourth timing corresponding to the third timing.

According to this aspect of the invention, the detection of an error can be actively attempted by transmitting data to the other projection type display device at the timing set by the host device.

In yet another preferable aspect of the invention, the other projection type display device transmits first data to the first signal receiving unit as the transmission data at a first timing, the first detection unit detects the error in a first case where the first signal receiving unit does not receive the first data at a second timing corresponding to the first timing and a second case where the first signal receiving unit receives the error data, and the first display control unit makes the first display unit display different images as the first image in the first and second cases.

According to this aspect of the invention, the user can see which of the error that occurs in the first case and the error that occurs in the second case has occurred by distinguishing the displayed image.

In still yet another preferable aspect of the invention, the projection type display device further includes a first signal transmission unit that transmits second data to the other projection type display device at a third timing, the other projection type display device transmits third data to the first signal receiving unit as the transmission data in response to the reception of the second data transmitted from the first signal transmission unit, the first detection unit detects the error in a first case where the first signal receiving unit does not receive the third data at a fourth timing corresponding to the third timing and a second case where the first signal receiving unit receives the error data, and the first display control unit makes the first display unit display different images as the first image in the first and second cases.

According to this aspect of the invention, the user can see which of the error that occurs in the first case and the error that occurs in the second case has occurred by distinguishing the displayed image.

In further another preferable aspect of the invention, the first detection unit detects the error when the first display unit and the other projection type display device display the images so as to overlap each other.

According to this aspect of the invention, when only the brightness of the displayed image is changed even if an error occurs, it is possible to reliably notify the user that the error has occurred.

Another aspect of the invention is directed to a display system including: a first projection type display device that is the projection type display device described above; and a second projection type display device. The second projection type display device includes: a second display unit that projects and displays an image; a second signal receiving unit that receives the second data transmitted as the transmission data from the first projection type display device at the third timing, a second signal transmission unit that transmits the third data to the first projection type display device as the transmission data in response to the reception of the second data of the second signal receiving unit; a second detection unit that detects an error in an image display operation of the first projection type display device on the basis of receiving conditions of the transmission data in the second signal receiving unit; and a second display control unit that, when the error is detected by the second detection unit, makes the second display unit display a second image, which shows that the error has been detected, at the position not overlapping the first image.

According to this display system, since the first and second images are separately displayed without overlapping each other, the content displayed in each image can be reliably transmitted to the user.

In a preferable aspect of the invention, the first detection unit detects an error in the image display operation of the second projection type display device and the first and second display units display images so as to overlap each other, and the second detection unit detects an error in the image display operation of the first projection type display device in the above case.

According to this aspect of the invention, when only the brightness of the displayed image is changed even if an error occurs, it is possible to reliably notify the user that the error has occurred.

In addition, the invention may be regarded not only as the projection type display device and the display system but also as a display method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments

Hereinafter, embodiments of the invention will be described with reference to the accompanying drawings.

Figure 1:
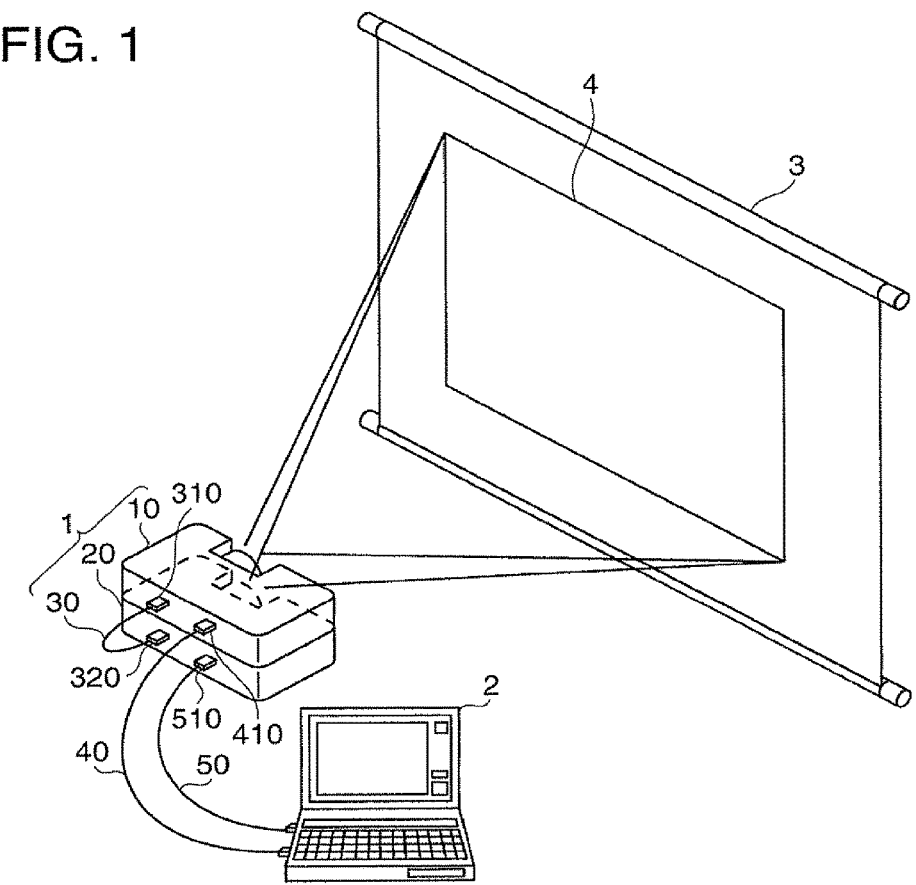
FIG. 1 is a view showing the appearance of a display system according to an embodiment.

FIG. 1 is a view showing the appearance of a display system 1 according to an embodiment. The display system 1 includes a commander (master) 10, a slave 20, and a communication line 30. The commander 10 and the slave 20 are projection type display devices (so-called projectors) that project and display an image. The communication line 30 has connectors 310 and 320 at both ends. The connector 310 is connected to the commander 10, and the connector 320 is connected to the slave 20. Thus, the communication line 30 is connected to both the commander 10 and the slave 20, so that the commander 10 and the slave 20 can communicate with each other through the communication line 30. In addition, the commander 10 and the slave 20 are connected to a PC (Personal Computer; this may be a notebook type personal computer or a tablet type personal computer) 2 through cables 40 and 50, respectively. The cable 40 has a connector 410 at one end, and the connector 410 is connected to the commander 10. In addition, the cable 50 has a connector 510 at one end, and the connector 510 is connected to the slave 20. In addition, connection between each of the commander 10 and the slave 20 and the PC 2 may be made through a hub, or so-called cascade connection may be made in which one projector is connected to the PC 2 through the other projector.

The PC 2 is an apparatus that generates or stores data showing images (called image data). The images referred to herein include a still image such as a photograph or a moving image (also called a video) such as a movie. The PC 2 transmits the image data to the commander 10 and the slave 20 through the cables 40 and 50, respectively. The commander 10 and the slave 20 project images, which are indicated by the image data transmitted from the PC 2, toward a screen 3. In the display system 1, the images projected from the commander 10 and the slave 20 are adjusted so as to overlap and be displayed in a certain region of the screen 3. Specifically, setting of the sizes, shapes, focus, and the like of the images is adjusted. The region where images overlapping each other in this manner are displayed is called a "display region" hereinbelow. FIG. 1 shows that images projected from the commander 10 and the slave 20 overlap and are displayed in a display region 4 of the screen 3.

As described above, "a plurality of projectors display images in a display region so as to overlap each other" is called a stack display. Hereinbelow, an image displayed in the display region by the stack display is called an overlapping image. The stack display is used to display a 3D image by overlapping an image for the left eye and an image for the right eye, for example. In addition, the stack display is used to display a brighter image (overlapping image) by adding light beams projected from a plurality of projectors when the brightness of a displayed image is not sufficient with one projector. In this case, the PC 2 transmits image data showing the same image to the commander 10 and the slave 20. The commander 10 and the slave 20 display images indicated by the image data transmitted thereto, that is, the same images in the display region 4 so as to overlap each other. In this case, if the original images to overlap shift from each other, a picture or characters shown in each image are viewed as a double image. In the display system 1, the above-described setting (sizes, shapes, focus, and the like of images) is adjusted so that the images are displayed as one image without shifting from each other.

When the stack display is performed, the commander 10 and the slave 20 operate in a stack display mode. In the stack display mode, the commander 10 transmits a command, which instructs the slave 20 to perform a predetermined operation, through the communication line 30, for example. On the other hand, the slave 20 operates on the basis of the command transmitted from the commander 10 and does not receive other operations.

Figure 2:
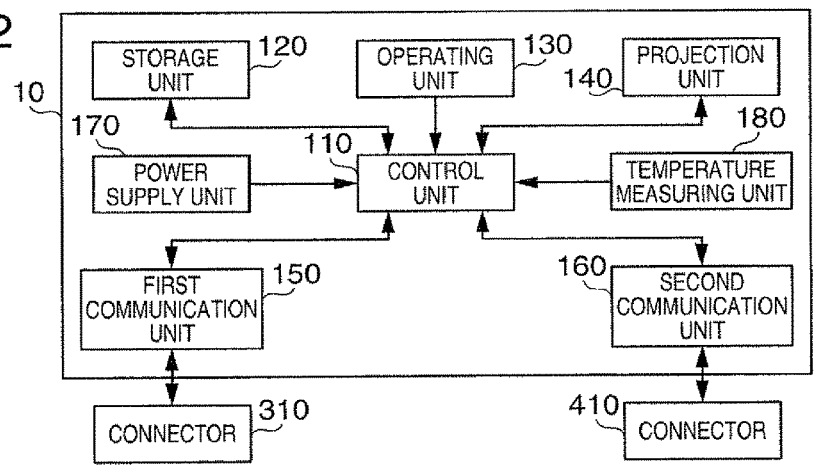
FIG. 2 is a block diagram showing the hardware configuration of a commander.

FIG. 2 is a block diagram showing the hardware configuration of the commander 10. The commander 10 includes a control unit 110, a storage unit 120, an operating unit 130, a projection unit 140, a first communication unit 150, a second communication unit 160, a power supply unit 170, and a temperature measuring unit 180. The control unit 110 includes a computing device, such as a CPU (Central Processing Unit), and storage devices, such as a ROM (Read Only Memory) and a RAM (Random Access Memory). The CPU controls the operation of each unit of the commander 10 by executing programs for the commander, which are stored in the ROM or the storage unit 120, using the RAM as a work area.

The storage unit 120 has a magnetic or optical recording device or a semiconductor memory device, and stores various programs including a control program and data, such as various setting values. For example, the storage unit 120 stores mode setting data indicating whether or not the stack display mode is set for its own device (commander 10). In addition, the storage unit 120 stores image data showing an OSD (On-Screen Display) image displayed by the commander 10. This OSD image is an image displayed in order for the user to operate the commander 10, an image displayed in order to notify the user of predetermined information, or the like. The operating unit 130 is connected to the control unit 110. The operating unit 130 includes various switches and an indicator lamp, and may include an operation panel disposed on the exterior housing (not shown) of the commander 10 or may include a light receiving section that receives an infrared signal from a so-called remote (remote controller). The OSD image described above is selected or its display is changed by the operation of the operating unit 130.

The projection unit 140 includes a discharge lamp having two electrodes, which are disposed so as to be spaced apart from each other, and a liquid crystal panel (liquid crystal light valve) that modulates light according to image data, for example. When a voltage is applied, the discharge lamp emits light by discharge generated between the two electrodes, and emits the light in a predetermined direction. The liquid crystal panel is driven according to the image data, and modulates the light emitted from the discharge lamp so as to display an image indicated by the image data. The projection unit 140 projects the light modulated by the liquid crystal panel and displays an image expressed by the light on the screen 3 shown in FIG. 1, for example. In addition, the projection unit 140 includes a fan for cooling the discharge lamp, a sensor that detects whether or not the discharge lamp can be turned on, and a sensor (not shown) that detects whether or not the fan can rotate. In addition, the projection unit 140 includes a measurement unit that measures the use time of the discharge lamp. The sensors and the measurement unit supply the data, which indicates the detected or measured result, to the control unit 110.

The first communication unit 150 has a connector, and this connector is connected to the connector 310 of the communication line 30. The first communication unit 150 transmits or receives data to or from the slave 20 through the communication line 30 connected as described above. The second communication unit 160 has a connector, and this connector is connected to the connector 410 of the cable 40 shown in FIG. 1. The second communication unit 160 receives the image data transmitted from the PC 2 through the cable 40 connected as described above. The power supply unit 170 is a unit that supplies electric power to each unit of the commander 10. When the supply of electric power from the power supply unit 170 is stopped by the control of the control unit 110, that is, when the power is off, the discharge lamp of the projection unit 140 is turned off and accordingly no image is displayed, and communication with the slave 20 through the first communication unit 150 is no longer performed. The temperature measuring unit 180 is a unit that measures the temperature of a predetermined location inside the commander 10 (for example, temperature near the discharge lamp). The temperature measuring unit 180 supplies data indicating the measured temperature to the control unit 110.

Figure 3:
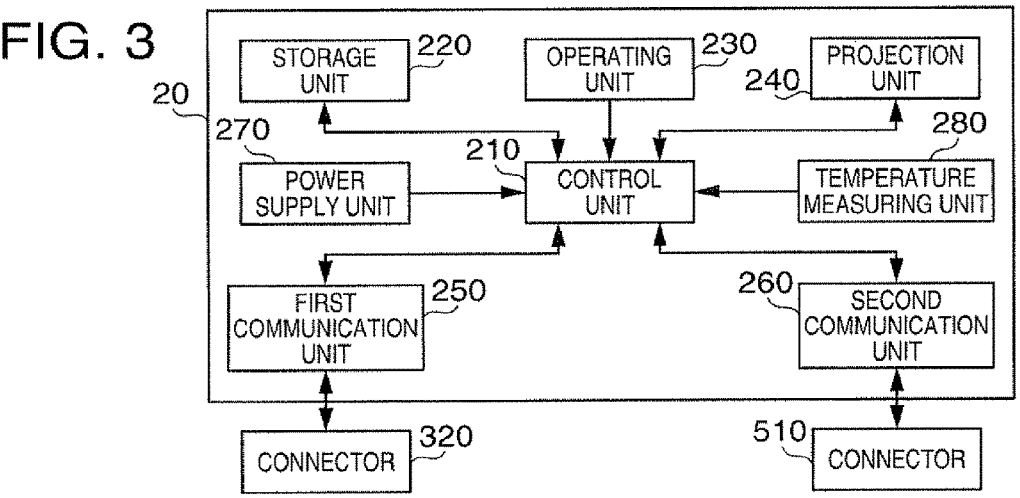
FIG. 3 is a block diagram showing the hardware configuration of a slave.

FIG. 3 is a block diagram showing the hardware configuration of the slave 20. The slave 20 includes the hardware in common with the commander 10. That is, the slave 20 includes a control unit 210, a storage unit 220, an operating unit 230, a projection unit 240, a first communication unit 250, a second communication unit 260, a power supply unit 270, and a temperature measuring unit 280. In the slave 20, however, unlike the commander 10, a connector of the first communication unit 250 is connected to the connector 320 of the communication line 30, and a connector of the second communication unit 260 is connected to the connector 510 of the cable 50. In addition, a program stored in the storage unit of the slave 20 is different from that in the commander 10, and a program for a slave instead of a commander is stored. By executing the program for a slave, the slave 20 performs a different operation from the commander 10 to realize a different function. In the commander 10 and the slave 20, each control unit executes a program to control each unit, thereby realizing the function shown below.

Figure 4:
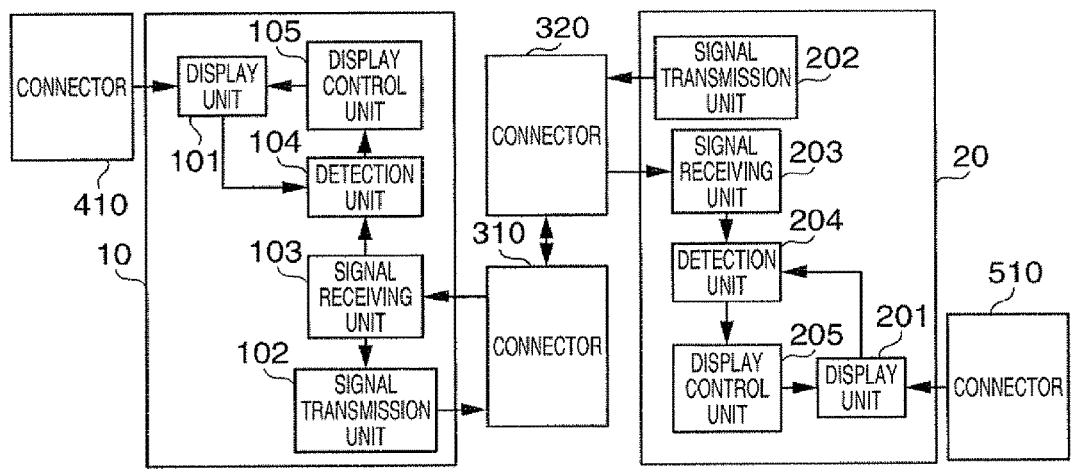
FIG. 4 is a block diagram showing the functional configuration of the display system.

FIG. 4 is a block diagram showing the functions realized by the commander 10 and the slave 20. The commander 10 includes a display unit 101, a signal transmission unit 102, a signal receiving unit 103, a detection unit 104, and a display control unit 105. In addition, the slave 20 includes a display unit 201, a signal transmission unit 202, a signal receiving unit 203, a detection unit 204, and a display control unit 205. The display unit 101 is a unit that is connected to the connector 410 of the cable 40 shown in FIG. 1 and projects and displays an image indicated by the image data transmitted from the PC 2 through the cable 40. The display unit 101 is a function realized by the cooperation of the control unit 110, the projection unit 140, and the second communication unit 160 shown in FIG. 2. The display unit 201 is a unit that is connected to the connector 510 of the cable 50 and projects and displays an image indicated by the image data transmitted from the PC 2 through the cable 50. The display unit 201 is a function realized by the cooperation of the control unit 210, the projection unit 240, and the second communication unit 260 shown in FIG. 3.

The signal transmission unit 102 is connected to the connector 310 of the communication line 30 shown in FIG. 1, and the signal transmission unit 202 is connected to the connector 320. The signal transmission units 102 and 202 are units that transmit data to another projection type display device through the communication line 30 connected as described above. Another projection type display device is the slave 20 in the case of the signal transmission unit 102 and the commander 10 in the case of the signal transmission unit 202. The data transmitted from the signal transmission units 102 and 202 is called "transmission data" hereinbelow. For example, the signal transmission unit 102 transmits the data stored in the storage unit 120 as transmission data at a predetermined timing. The signal transmission unit 102 is a function realized by the cooperation of the control unit 110, the storage unit 120, and the second communication unit 160 shown in FIG. 2. In addition, the signal transmission unit 202 transmits the data stored in the storage unit 220 as transmission data at a predetermined timing, for example. The signal transmission unit 202 is a function realized by the cooperation of the control unit 210, the storage unit 220, and the second communication unit 260 shown in FIG. 3.

The signal receiving unit 103 is connected to the connector 310 of the communication line 30, and the signal receiving unit 203 is connected to the connector 320. The signal receiving units 103 and 203 are units that receive the transmission data transmitted from another projection type display device through the communication line 30 connected as described above. Another projection type display device is the slave 20 in the case of the signal receiving unit 103 and the commander 10 in the case of the signal receiving unit 203. The signal receiving unit 103 is a function realized by the cooperation of the control unit 110 and the second communication unit 160 shown in FIG. 2. The signal receiving unit 203 is a function realized by the cooperation of the control unit 210 and the second communication unit 260 shown in FIG. 2. The signal receiving unit 103 supplies the received transmission data to the signal transmission unit 102 and the detection unit 104. The signal receiving unit 203 supplies the received transmission data to the signal transmission unit 202 and the detection unit 204.

The detection unit 104 is a unit that detects an error in the image display operation of the slave 20 on the basis of the transmission data receiving conditions of the signal receiving unit 103. The receiving conditions referred to herein are conditions related to whether or not certain data has been received at a predetermined timing or conditions related to whether or not data showing the predetermined content has been received regardless of timing, for example. Details of the data will be described later. The detection unit 104 is a function realized by the cooperation of the control unit 110, the storage unit 120, and the second communication unit 160 shown in FIG. 2. In addition, the detection unit 204 is a unit that detects an error in the image display operation of the commander 10 on the basis of the data receiving conditions of the signal receiving unit 203. The detection unit 204 is a function realized by the cooperation of the control unit 210, the storage unit 220, and the second communication unit 260 shown in FIG. 3. The detection units 104 and 204 supply data indicating that an error has been detected to the display control units 105 and 205, respectively.

The display control unit 105 is a unit that, when an error is detected by the detection unit 104, makes the display unit 101 display an image showing that the error has been detected. The display control unit 105 is a function realized by the cooperation of the control unit 110, the storage unit 120, and the projection unit 140 shown in FIG. 2. In addition, the display control unit 205 is a unit that, when an error is detected by the detection unit 204, makes the display unit 201 display an image showing that the error has been detected. The display control unit 205 is a function realized by the cooperation of the control unit 210, the storage unit 220, and the projection unit 240 shown in FIG. 3. The display control unit 205 displays this image at the position that does not overlap the image that is displayed on the display unit 101 by the display control unit 105.

When an error occurs in a certain projector while performing the stack display, the display system 1 performs processing for notifying the user that an error has occurred. Examples of the error referred to herein include an error (called a high temperature error) in which the temperature of a predetermined location inside a projector is higher than a threshold value (called a temperature threshold value) and an error (called fan failure) in which a fan breaks down and does not rotate. In addition, there is an error (called lamp-out) in which the discharge lamp does not light due to its lifespan. In addition, there is an error (called a lamp lifespan) in which the cumulative value of the use time after the discharge lamp is attached to the projector exceeds a threshold value (called a time threshold value) assumed as the lifespan of the discharge lamp. The time threshold values may be set to the value, such as 3000 hours or 4000 hours, for example. When these errors are detected, the control unit of the projector turns off the discharge lamp when the discharge lamp is on, and rotates a fan for about 1 to 3 minutes to cool the discharge lamp. Then, the control unit controls the power supply unit to stop the supply of electric power. In addition, when fan failure is detected, the control unit stops the supply of electric power immediately since it is not possible to cool the discharge lamp. Thus, even after an error occurs, the control unit can control each unit. The error in which the power of the projector is turned off by the control of the control unit is called a first type of error hereinbelow.

As errors occurring in the projector, in addition to those described above, there is an error (called control unit failure) in which a computing device or a storage device provided in the control unit fails or an error (called hang-up) in which the process loops and accordingly the computing device cannot perform other processes. Thus, the error in which the control unit cannot control each unit after the occurrence of an error is called a second type of error. In this case, since the control unit cannot control each unit, neither the cooling of the discharge lamp described above nor the stopping of supply of electric power may be performed. As a result, when another error occurs, for example, when a high temperature error occurs, a temperature increase is not stopped because neither cooling nor stopping is performed. This may cause still another error.

In addition, in the display system 1, there is an error (called a communication error) in which data communication between the commander 10 and the slave 20 is no longer performed due to disconnection or absence of the communication line 30 in the projector. In this case, since a command transmitted from the commander 10 does not reach the slave 20, the user cannot operate the slave 20. On the other hand, since no error occurs, the power of the projector is not turned off. Thus, the error in which communication between projectors is not possible is called a third type of error.

In the display system 1, a plurality of types of errors described above occur. The display system 1 performs a different process according to which projector an error occurs in and the type of the error that has occurred, and notifies the user of the occurrence of an error. As a first process of these processes, one projector notifies the other projector of an error that has occurred in itself, and the other projector notifies a user of the error. This process is called an "error notification process" hereinbelow. In this error notification process, when the above-described error occurs, the other projection type display device, that is, a projector on the other party transmits data indicating that an error has occurred (hereinafter, referred to as "error data"). The error data is one of the pieces of transmission data transmitted from the signal transmission units 102 and 202 shown in FIG. 4. In addition, the detection unit 104 detects the error when the signal receiving unit 103 receives the error data, and the detection unit 204 detects the error when the signal receiving unit 203 receives the error data.

Figure 5:
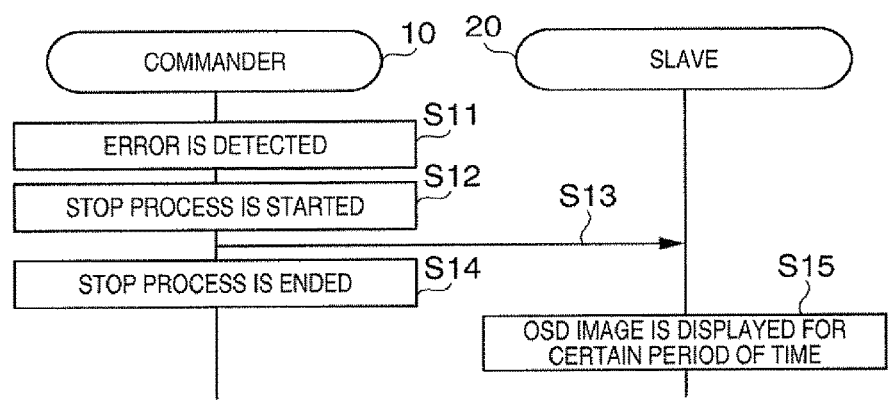
FIG. 5 is a view showing the operation performed by each projector in the error notification process.

FIG. 5 is a sequence chart showing an example of the operation performed by each projector in the error notification process. The commander 10 and the slave 20 start the error notification process when an error occurs in themselves. This example shows a case when an error occurs in the commander 10. First, the commander 10 detects the error that has occurred in itself (step S11). Hereinafter, a specific example of the operation when the commander 10 detects an error will be described. The commander 10 detects the above-described high temperature error when the temperature measured by the temperature measuring unit 180 exceeds the above-described temperature threshold value. In addition, the commander 10 detects the above-described fan failure when the sensor of the projection unit 140 detects that the fan can not rotate, and detects the above-described lamp-out when the sensor of the projection unit 140 detects that the discharge lamp cannot light. In addition, the commander 10 stores the use time measured by the measuring unit of the projection unit 140, and detects the lamp lifespan when the cumulative value of the stored use time exceeds the above-described time threshold value. Step S11 is the operation performed by the detection unit 104 shown in FIG. 4.

Then, the commander 10 starts a stopping process (step S12). As described above, this stopping process is a process of turning off the power after cooling the discharge lamp, that is, a process of stopping the projector. The stopping process is performed by controlling each unit with the control unit 110 of the commander 10. As described above, it takes several minutes to cool the discharge lamp in the stopping process. In the meantime, the commander 10 transmits to the slave 20 the above-described error data including the details of the error (step S13). Step S13 is the operation performed by the signal transmission unit 102 shown in FIG. 4. The commander 10 transmits the error data to notify the slave 20 of the error indicated by the error data. Then, in the commander 10, the power is turned off and the stopping process ends (step S14). When the error data transmitted in step S13 is received, the slave 20 detects the error indicated by the error data. Then, the slave 20 displays an OSD image based on the error data for a certain period of time (for example, 10 seconds) (step S15). Step S15 is the operation performed by the signal receiving unit 203, the detection unit 204, and the display control unit 205 shown in FIG. 4. In addition, instead of being ended when a certain period of time elapses, the display of an OSD image may be ended when there is an operation of the user using the operating unit 130. The same is true for OSD images shown hereinbelow.

Figure 6:
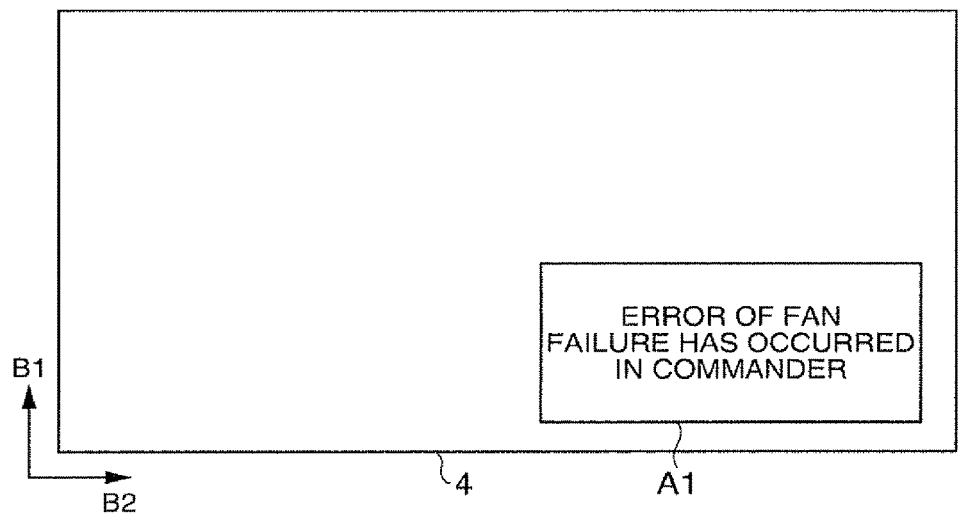
FIG. 6 is a view showing an example of the OSD image displayed by the slave.

FIG. 6 is a view showing an example of the OSD image displayed by the slave 20. In FIG. 6, an OSD image A1 displayed in the display region 4 is shown. In FIG. 6, the arrow B1 showing a vertical direction and the arrow B2 showing a horizontal direction are shown. The slave 20 displays the OSD image A1 in a portion located on the bottom side in the vertical direction and the right side in the horizontal direction in the display region 4. In this example, it is assumed that the fan failure has been detected in step S11. In this case, the slave 20 displays the OSD image A1 showing the character string "an error of fan failure has occurred in the commander". Thus, the OSD image A1 shows in which projector (in this case, the commander 10) an error has occurred and the details (in this case, fan failure) of the error. The operation described above is similarly executed even if the commander 10 and the slave 20 are exchanged. In this case, the commander 10 performs the same process as in step S15 to display the OSD image showing that the error has occurred in the slave 20 and the details of the error.

After the process of step S14 is performed, the image displayed in the display region 4 changes from the overlapping image to an image displayed by only one projector (in the above example, the slave 20). In this case, although the brightness of the image is reduced, the image itself is not changed. For this reason, if the processing of step S15 is not performed, the user who is using the display system 1 may not notice the error. In addition, for example, even if an LED for notification of the occurrence of an error is provided in the main body of the projector, the user may not notice the lighting of the LED because the user observes the display region 4 shown in FIG. 1. In the display system 1, even when the commander 10 in which an error has occurred cannot display an image, the OSD image shown in FIG. 6 is displayed by the slave 20 in which no error has occurred. The slave 20 can reliably notify the user, who is observing the display region 4, that an error has occurred in the projector by displaying the OSD image. The user who is observing the display region 4 is a user who is using the display system 1.

The above-described error data is data that is transmitted when an error occurs from the device itself (in this example, the commander 10) in which the error has occurred. That is, the slave 20 detects an error on the basis of communication performed when an error occurs. On the other hand, for example, it is assumed that another device has detected an error of the commander 10 by communication with the commander 10 at a certain timing. The certain timing referred to herein is a timing which is not relevant to the occurrence of an error. In this device, unless the communication timing and the error occurrence timing match with each other by chance, the error detection timing is late compared with that when the slave 20 receives the error data. Thus, if the error data is transmitted, the slave 20 can detect the occurrence of an error early and notify the user, compared with a device that detects an error on the basis of communication performed at a timing that is not relevant to the occurrence of the error.

A system may be used which displays the details of an error caused in a projector on a remote-connected device for management so that the administrator in a remote location can handle the situation. In this case, since only the administrator knows the details of the error, measures for restoration cannot be taken unless there is contact from the administrator or unless the administrator goes there. In addition, when the user notices an error by the change in brightness or the lighting of the LED described above, the user notices the occurrence of the error but does not know the details of the error. The projector according to the present embodiment can also notify the user of the details of the caused error by displaying the OSD image shown in FIG. 6. For this reason, the user can easily understand the details of the error on the spot, and can perform an operation for restoration to display the overlapping image again if possible. In addition, the user may determine to use one projector continuously depending on the details of the error or the details of the displayed image. In the display system 1, since the details of the error can be checked, this determination can also be made early compared with the other cases described above. As a result, in the display system 1, it is possible to improve the availability, that is, it is possible to increase the time used by the user compared with other cases.

In the error notification process described above, the control unit 110 of the commander 10 performs an operation, such as the stopping process, after the occurrence of an error. Such an operation is performed when the first type of error described above occurs. However, when the second type of error occurs, such an operation is not performed since the control unit 110 cannot control each unit. When the second type of error occurs, the display system 1 performs a second process, which is different from the error notification process, to notify the user that the error has occurred. In this second process, the commander 10 and the slave 20 perform operations to notify each other that they continue operations to display an image. This second process is called a "mutual notification process" hereinbelow. The mutual notification process is performed for a period during which the detection of the detection units 104 and 204 shown in FIG. 4 is possible (for example, in the case of the detection unit 104, a period for which the control unit 110 and the second communication unit 160 are operating). This period includes not only a period for which the stack display is performed but also a period for which power of the projector is on but there is no image display by the display unit. In this mutual notification process, one projector (an example of another projection type display device) transmits data (an example of transmission data) to the other projector at the first timing. Then, when the data is not received at the second timing corresponding to the first timing, the other projector detects the error.

Figure 7:
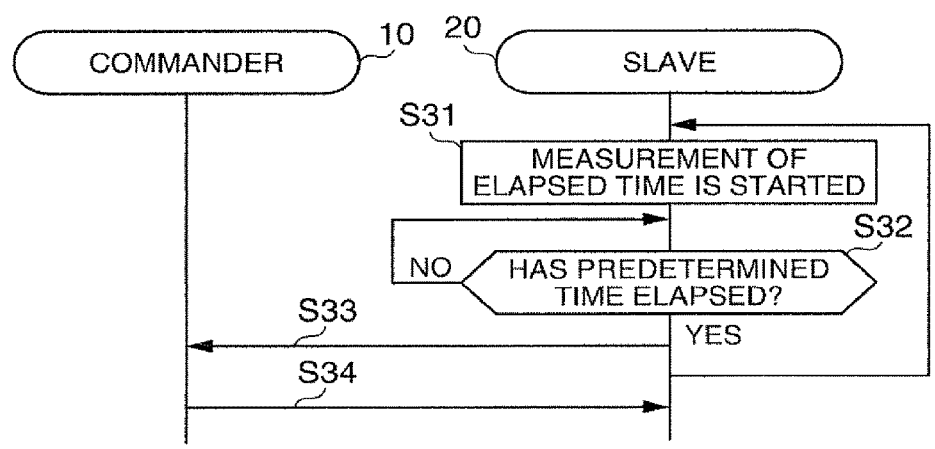
FIG. 7 is a view showing the operation performed by each projector in the mutual notification process.

FIG. 7 is a sequence chart showing an example of the operation performed by each projector in the mutual notification process. The commander 10 and the slave 20 start the mutual notification process, for example, when a stack display mode is set or the commander 10 and the slave 20 are started in a state where the stack display mode is set.

First, the slave 20 starts measuring elapsed time (step S31). Then, the slave 20 determines whether or not the measured elapsed time has reached a predetermined time (for example, 1 second), that is, whether or not the predetermined time has elapsed from the start of the measurement (step S32). When the determination in step S32 is NO, the slave 20 repeats the process of step S32. That is, the slave 20 repeats the process of step S32 until the predetermined time elapses.

When the determination in step S32 is YES, the slave 20 transmits certain data to the commander 10 through the first communication unit 250 (step S33). This data indicates that the slave 20 continues an operation to display an image. The slave 20 performs the operation of step S31 again after performing the operation of step S33. In this manner, the slave 20 repeatedly performs the operation of steps S31 to S33. By repeating this operation, the slave 20 transmits data to the commander 10 at intervals of a predetermined time, that is, periodically. This data transmitted periodically is called "periodic data" (an example of transmission data and first data) hereinbelow. The timing at which the slave 20 transmits periodic data is called "periodic data transmission timing" (an example of first timing) hereinbelow. This periodic data transmission timing is a timing occurring at intervals of a predetermined time. The slave 20 notifies the commander 10 that the slave 20 continues the operation to display an image by transmitting the periodic data. Steps S31, S32, and S33 are the operations performed by the signal transmission unit 202 shown in FIG. 4.

When the periodic data transmitted from the slave 20 is received, the commander 10 transmits data, which indicates that the commander 10 continues the operation to display an image, in response to the periodic data (step S34). This data transmitted in response to the periodic data is called "response data" (an example of third data and transmission data) hereinbelow. The commander 10 notifies the slave 20 that the commander 10 continues the operation to display an image by transmitting the response data. The timing at which the commander 10 transmits response data in response to the reception of the data transmitted from the slave 20 is called a "response data transmission timing" (an example of third timing) hereinbelow. This response data transmission timing is a timing when the periodic data transmission timing is shifted back by the time required for the communication of periodic data. That is, similar to the periodic data transmission timing, the response data transmission timing is a timing occurring at intervals of a predetermined time. As described above, the commander 10 and the slave 20 confirm that both continue the operation to display an image by receiving the periodic data and the response data, respectively. Subsequently, an operation when an error occurs in a certain projector while the mutual notification process is being performed will be described.

Figure 8:
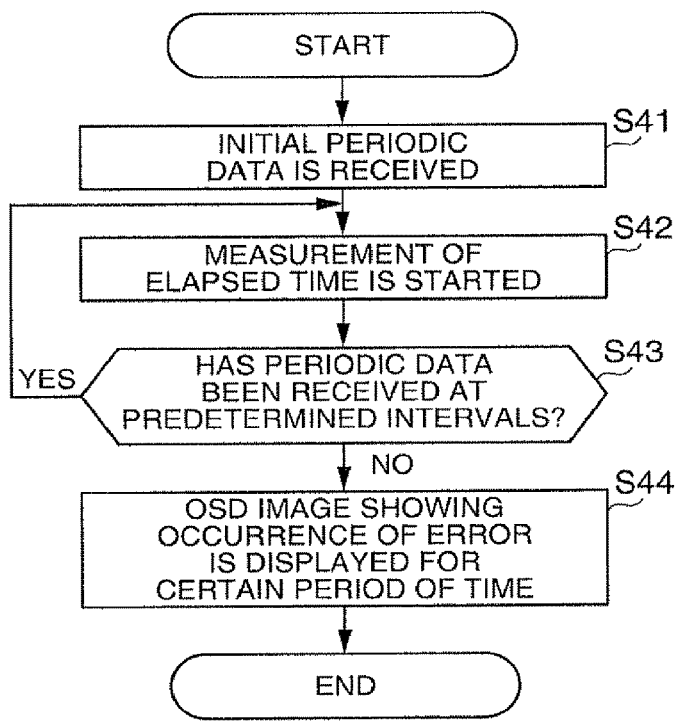
FIG. 8 is a view showing the operation performed by the commander when an error occurs in the slave.

FIG. 8 is a flow chart showing an example of the operation performed by the commander 10 when an error occurs in the slave 20. The commander 10 starts this operation in the same manner as in the operation shown in FIG. 7. First, the commander 10 receives the first periodic data in step S33 shown in FIG. 7 (step S41). Then, the commander 10 starts measuring elapsed time (step S42). Then, the commander 10 determines whether or not the periodic data has been received at a timing at which the measured elapsed time has reached a predetermined time (step S43). This timing is called a "periodic data receiving timing" (an example of second timing) hereinbelow.

In the present embodiment, since the periodic data transmission timing is a timing occurring at intervals of a predetermined time, the periodic data receiving timing is also a timing occurring at intervals of a predetermined time. That is, the periodic data receiving timing is a timing corresponding to the periodic data transmission timing. In addition, the periodic data receiving timing may be the time itself when the elapsed time reaches a predetermined time, or may include a predetermined range before and after the time (for example, 0.1 second before the time and 0.1 second after the time). In any case, it is preferable that the periodic data receiving timing be a timing corresponding to the periodic data transmission timing. Steps S41, S42, and S43 are the operation performed by the signal receiving unit 103 and the detection unit 104 shown in FIG. 4. When the determination in step S43 is YES, the commander 10 performs the process of step S42 again. When the determination in step S43 is NO, the commander 10 displays an OSD image, which shows that an error has occurred in the slave 20, for a certain period of time (step S44), and ends this operation. Step S44 is the operation performed by the display control unit 105.

Figure 9:
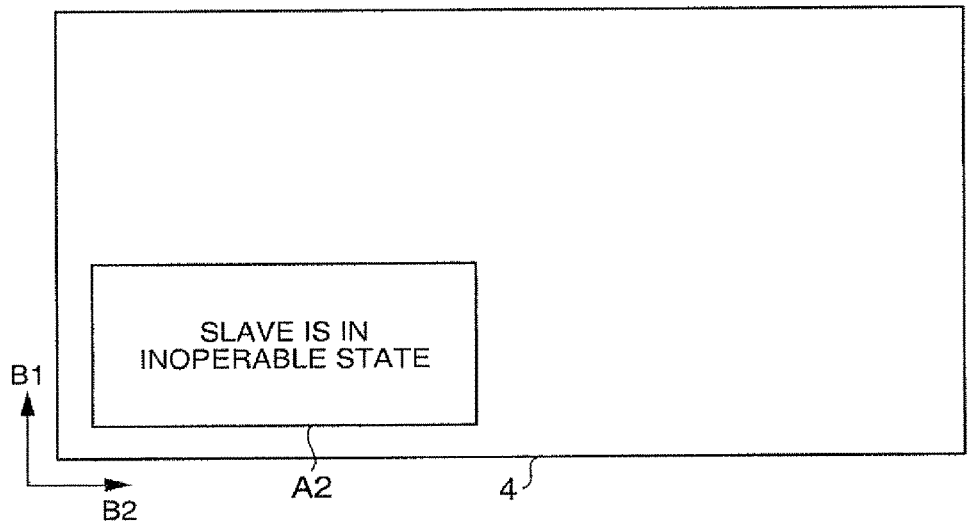
FIG. 9 is a view showing an example of the OSD image displayed by the commander.

FIG. 9 is a view showing an example of the OSD image displayed by the commander 10. In FIG. 9, an OSD image A2 displayed in the display region 4 is shown. The OSD image A2 is displayed in a portion located on the bottom side in the vertical direction and the left side in the horizontal direction in the display region 4. This OSD image A2 is displayed when the transmission of periodic data from the slave 20 is interrupted. In this case, in the slave 20, for example, the second type of error described above occurs. Since the control unit cannot control each unit if the second type of error occurs, an operation through the operating unit can no longer be received. In this case, the commander 10 displays the OSD image A2 showing the character string "the slave is in an inoperable state". Through the OSD image A2, the user can see that a certain error has occurred in the slave even though the details of the error are not known and that the response should be power down since the slave cannot operate.

As described above, the commander 10 detects an error in a first case where the periodic data transmitted from the slave 20 at the above-described periodic data transmission timing is not received at the periodic data receiving timing. Accordingly, the commander 10 can notify that an error has occurred in the slave 20 even when the slave 20 cannot transmit data. In addition, the commander 10 also detects an error in a second case where the error data transmitted from the slave 20 is received. In addition, in the commander 10, the display control unit 105 makes the display unit 101 display different images in the first and second cases. These different images are an image when the commander 10 displays the same image as the OSD image A1 shown in FIG. 6 and the OSD image A2 shown in FIG. 9, for example. Therefore, the user can see which of the error occurring in the first case (for example, the second type of error) and the error occurring in the second case (for example, the first type of error) has occurred by checking the displayed OSD image.

Figure 10:
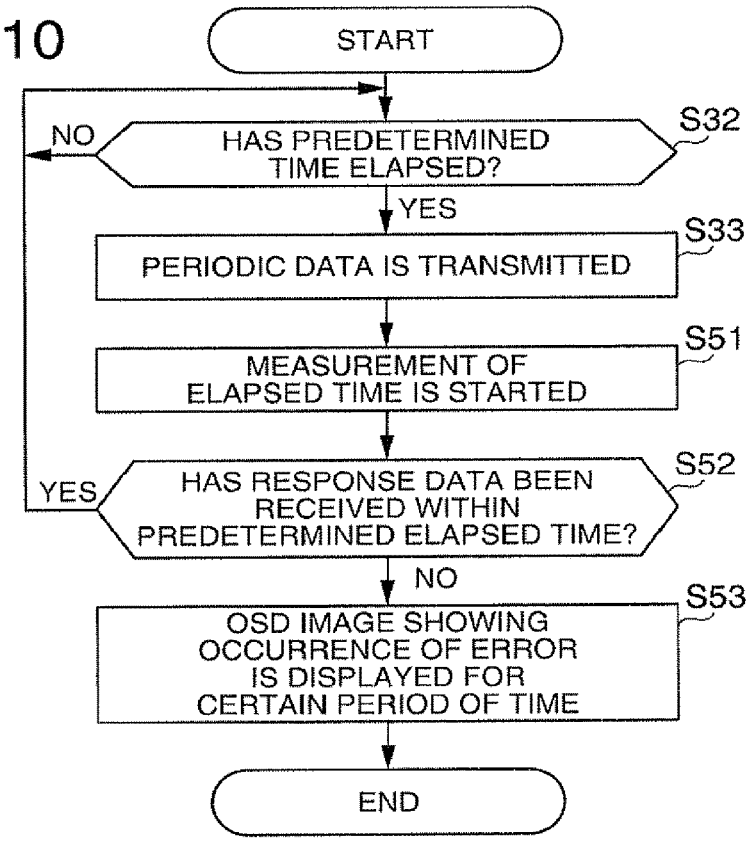
FIG. 10 is a view showing the operation performed by the slave when an error occurs in the commander.

FIG. 10 is a flow chart showing an example of the operation performed by the slave 20 when an error occurs in the commander 10. The slave 20 starts this operation when the process (start of the measurement of elapsed time) of step S31 shown in FIG. 7 is performed. First, the slave 20 performs the process of steps S32 (determination regarding the elapse of predetermined time) and S33 (transmission of periodic data). Then, the slave 20 starts measuring elapsed time from the time of the transmission of the periodic data (step S51). Then, the slave 20 determines whether or not the response data has been received at a timing at which the measured elapsed time has reached a predetermined time (step S52). This timing is called a "response data receiving timing" (an example of fourth timing) hereinbelow.

In the present embodiment, since the response data transmission timing is a timing occurring at intervals of a predetermined time, the response data receiving timing is also a timing occurring at intervals of a predetermined time. That is, the response data receiving timing is a timing corresponding to the response data transmission timing. In addition, the response data receiving timing may be the time itself when the elapsed time reaches a predetermined time, or may include a predetermined range before and after the time (for example, 0.1 second before the time and 0.1 second after the time). In any case, it is preferable that the response data receiving timing be a timing corresponding to the response data transmission timing. When the determination in step S52 is YES, the slave 20 performs the process of step S32. That is, while the determination in step S52 is YES, the slave 20 repeatedly performs the process of steps S32, S33, S51, and S52. When the determination in step S52 is NO, the slave 20 displays an OSD image, which shows that an error has occurred in the commander 10, for a certain period of time (step S53), and ends this operation. Steps S51 and S52 described above are the operation performed by the signal receiving unit 203 and the detection unit 204 shown in FIG. 4. In addition, step S53 is the operation performed by the display control unit 205.

Figure 11:
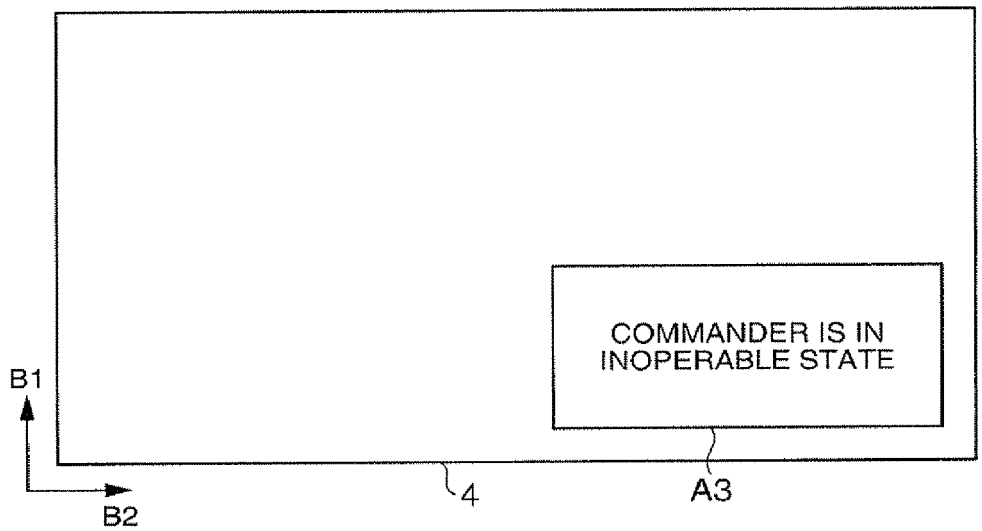
FIG. 11 is a view showing an example of the OSD image displayed by the slave.

FIG. 11 is a view showing an example of the OSD image displayed by the slave 20. In FIG. 11, an OSD image A3 displayed in the display region 4 is shown. The OSD image A3 is displayed in a portion located on the bottom side in the vertical direction and the right side in the horizontal direction in the display region 4. In the OSD image A3, the "slave" in the character string shown in the OSD image A2 is replaced with "commander". By performing the mutual notification process as described above, even if the second type of error, that is, an error that does not allow the control unit to control each unit after the occurrence of the error occurs, it is possible to notify the user of the situation.

If the third type of error described above, that is, an error that does not allow communication between projectors occurs when the mutual notification process is performed, neither the periodic data nor the response data reaches the other party. For this reason, both the commander 10 and the slave 20 display OSD images.

Figure 12:
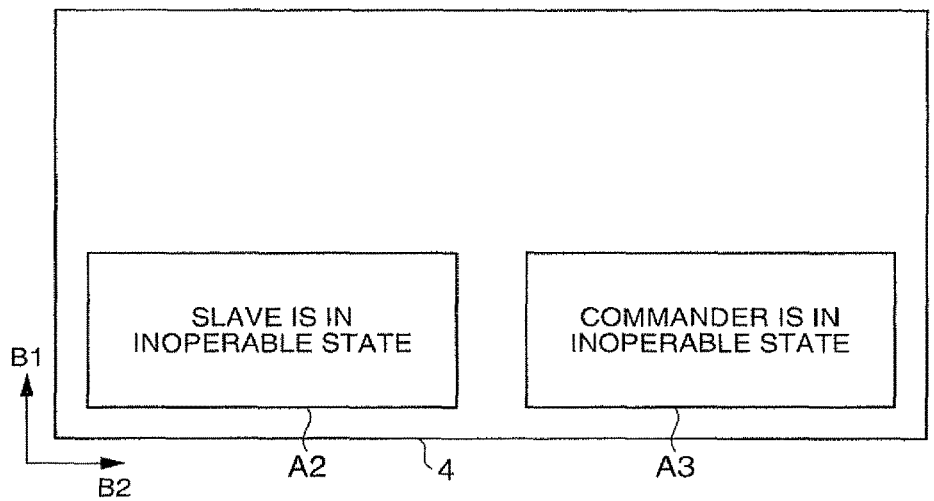
FIG. 12 is a view showing a display region when two OSD images are displayed.

FIG. 12 is a view showing the display region 4 when two OSD images are displayed. The OSD image A2 shown in FIG. 9 and the OSD image A3 shown in FIG. 11 are displayed in the display region 4. Both the commander 10 and the slave 20 display the OSD images on the bottom side in the vertical direction in the display region 4, but the positions of the OSD images are different in the horizontal direction. For this reason, the OSD images A2 and A3 (examples of the first and second images) are displayed so as not to overlap each other. If these OSD images overlap each other, the user may not read the character of the overlapping portion. According to the present embodiment, since OSD images do not overlap each other as described above, the user can certainly read the character string shown in the displayed OSD image. That is, the display system 1 can reliably notify the user that an error has occurred.

When the display system 1 performs stack display, even if an error occurs in a certain projector, only the brightness of the displayed image is changed as described above. In the display system 1, OSD images shown in FIGS. 6 and 9 and the like are displayed in the display region by performing the error notification process and the mutual notification process. In this manner, the display system 1 can reliably notify the occurrence of an error even if the stack display is being performed.

MODIFICATION EXAMPLES

The above-described embodiment is only an example of the implementation of the invention, and may be modified as follows. In addition, the above-described embodiment and each modification example shown below may be combined and executed when necessary.

First Modification Example

Although the display system 1 includes two projectors in the embodiment described above, the display system 1 may include three or more projectors. Also in this case, there is one projector that transmits a command used in the stack display, that is, there is one commander, and the other projectors are slaves. In this case, there are three methods of connecting projectors to each other through the communication line 30.

Figure 13A:
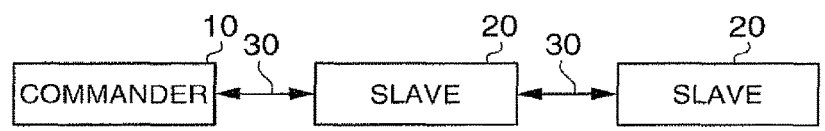
FIGS. 13A to 13C are views showing a method of connecting three projectors.
Figure 13B:
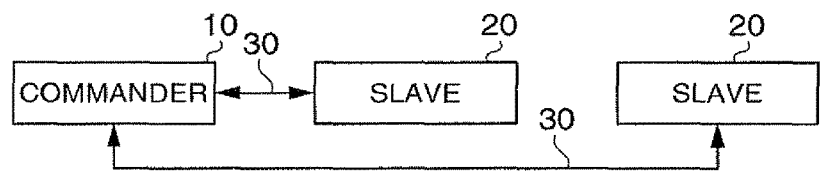
Figure 13C:
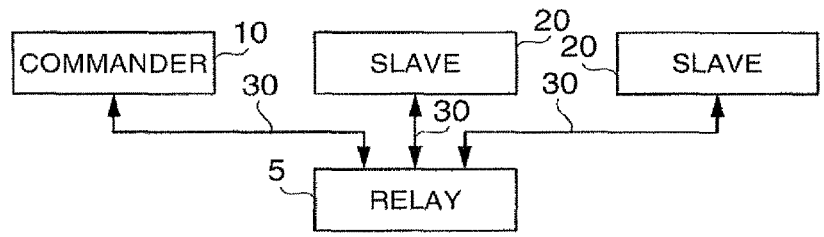

FIGS. 13A to 13C are views showing methods of connecting projectors to each other in a display system including three projectors. FIG. 13A shows a case where the commander 10 and the two slaves 20 are connected in series. In this case, a projector in which the first type of error has occurred transmits the error data to the other two projectors directly or through the middle slave 20. Then, the two projectors that have received the error data display the OSD images shown in FIG. 9 or 11. Display positions of the OSD images are determined according to which projector an error occurs in. For this reason, even when two projectors display OSD images, the OSD images are displayed at the same position if the projector which the error has occurred in is the same.

FIG. 13B shows a case where the commander 10 is connected to each of the two slaves 20 in a one-to-one manner. In this case, the slave 20 transmits error data to another slave 20 through the commander 10. FIG. 13C shows a case where three projectors are connected to each other through a relay 5. In this case, each projector transmits error data to the other two projectors directly without going through other projectors. In addition, error data from the slave 20 may be transmitted through the commander 10. The above method of transmitting the error data is similarly used when transmitting the periodic data or the response data.

Second Modification Example

Although the display system 1 performs stack display in the embodiment described above, it is also possible to display images using a method called tiling that displays images side by side (called tiling display). In the tiling display, when displaying images on the basis of data showing the images, the commander 10 and the slave 20 display different portions of the images. Also in this case, the display system 1 displays an OSD image, which shows which projector an error has occurred in, by performing the error notification process and the mutual notification process described in the embodiment. In the case of tiling, displayed images do not overlap each other, or only small portions (if the width of an image is 100 cm, about 1 cm or 2 cm) of the ends overlap each other. For this reason, no matter where each projector displays an OSD image, a situation does not occur in which the character string shown in each OSD image cannot be read since the OSD images overlap each other when the third type of error occurs, as described in FIG. 12. Therefore, each projector may display an OSD image at any position in a region where the image indicated by the image data transmitted from the PC 2 is displayed. In addition, for example, when performing tiling display using four projectors, the display system displays OSD images at positions described below.

Figure 14:
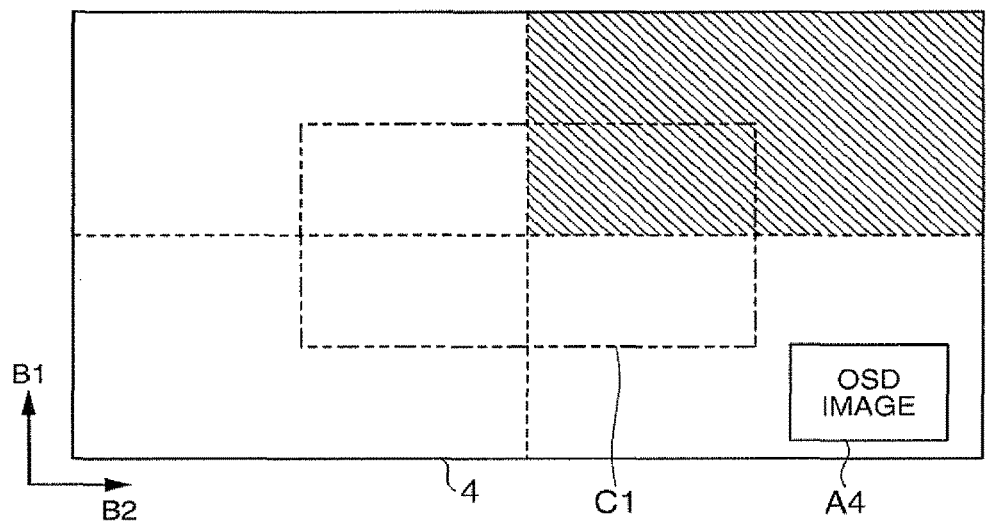
FIG. 14 is a view showing an example of the OSD image displayed in a display region that is tiling-displayed.

FIG. 14 is a view showing an example of the OSD image displayed in the display region 4 under tiling display. In the display region 4, four images are displayed side by side in two rows in each of the horizontal and vertical directions. The dotted line shown in FIG. 14 shows the boundary of each image. In this example, it is assumed that an error occurs in a projector that displays an upper right image (hatched for easy understanding). In this case, for example, a projector that displays a lower right image displays an OSD image A4. At this time, this projector displays the OSD image A4 outside a region C1 instead of a region C1 in the middle of the display region 4 indicated by the two-dot chain line. This region C1 is a rectangular region that is similar to the display region 4 and that passes through the midpoint of the line from the center to the end of the display region 4 in the vertical direction and the same midpoint in the horizontal direction, for example. In addition, in this case, projectors that display an upper left image and a lower left image do not display an OSD image. For example, when the displayed image is a presentation material or a film image, a portion near the middle of the display region 4 is an image that the user wants to see rather than a portion near the end in many cases. In such a case, in the display system, the OSD image can be displayed at the position where it is difficult to hide a portion that the user wants to see.

Third Modification Example

The display system 1 may be used for applications other than the stack display and the tiling display. For example, when the display system 1 is used for the application, such as having a meeting while watching a plurality of materials, the commander 10 and the slave 20 display different images on screens arrayed in the horizontal direction. Also in this case, since the commander 10 and the slave 20 are connected to each other through the communication line 30, the error notification process and the mutual notification process described above are performed. In such an application, the users have a meeting while watching both the images displayed by the respective projectors. Therefore, since a certain projector displays the OSD image described above, it is possible to reliably notify the user that an error has occurred in the projector. In short, the display system 1 may display images using any method as long as the display system 1 is used by a user who can see all images displayed by a plurality of projection type display devices.

Fourth Modification Example

The display system may capture an image of the display region 4 and detect that an error has occurred from the brightness of the captured image. In the stack display, when the first type of error occurs in a certain projector and accordingly the power is turned off, the brightness of the displayed image is reduced. In the display system according to this modification example, each projector includes an imaging unit that captures an image, and detects a reduction in the brightness on the basis of image data of the captured image.

Figure 15:
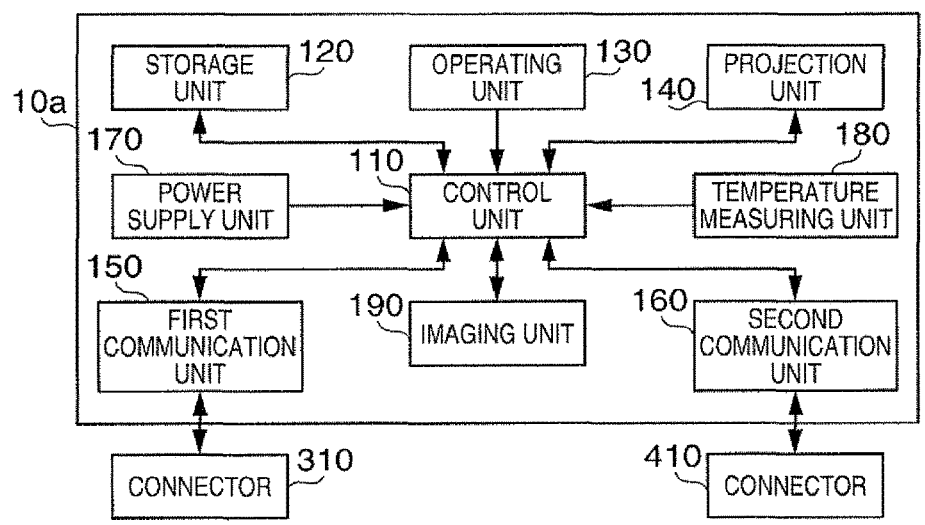
FIG. 15 is a view showing the hardware configuration of a commander according to a modification example.

FIG. 15 is a view showing the hardware configuration of a commander 10a according to this modification example. The commander 10a is different from the commander 10 shown in FIG. 2 in that the commander 10a includes an imaging unit 190. The imaging unit 190 is a digital camera, for example, and is a unit that captures an image. The imaging unit 190 is provided so as to be able to capture an image projected by the projection unit 140, and captures an image including the display region 4 shown in FIG. 1, for example. The imaging unit 190 supplies image data showing the captured image to the control unit 110. The control unit 110 detects that an error has occurred on the basis of the supplied image data.

Figure 16:
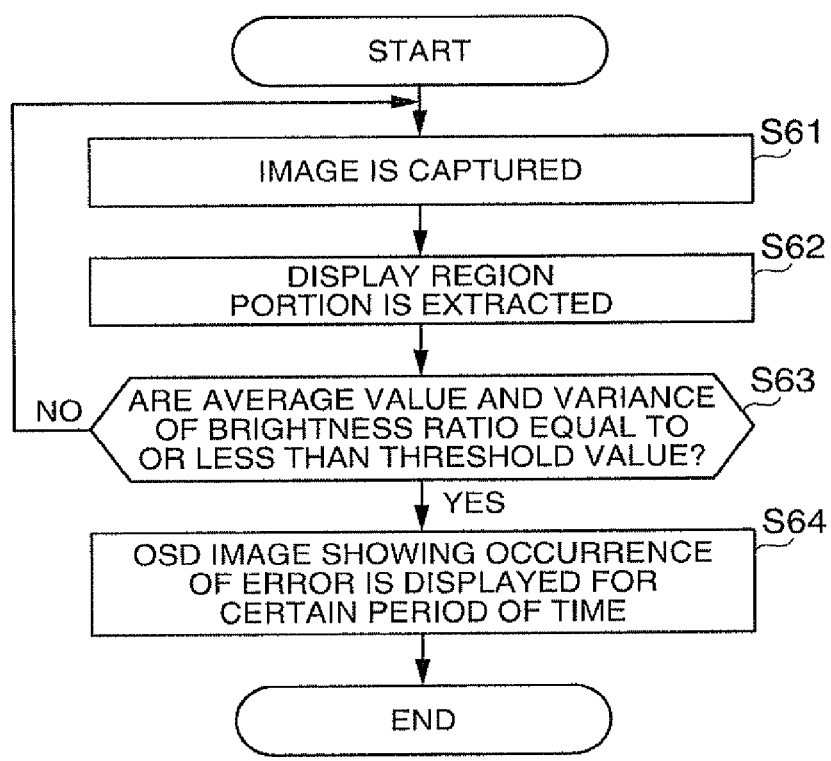
FIG. 16 is a view showing an operation when a commander detects an error in a modification example.

FIG. 16 is a flow chart showing the operation when the commander 10a detects an error in this modification example. The commander 10a is set to the stack display mode, and starts this operation when the stack display is started. First, the commander 10a captures an image including the display region 4 using the imaging unit 190 (step S61). Then, the commander 10a extracts a portion where the display region 4 is displayed (called a display region portion) from the captured image (step S62). The commander 10a performs this extraction on the basis of the values of the coordinates indicating the four corners of the display region portion input manually after the commander 10a is provided, for example. In addition, the commander 10a may also perform this extraction by specifying the display region portion using other known techniques. In addition, if the imaging unit 190 captures only a part of the display region 4, this extraction process may not be performed.

Then, the commander 10a calculates the ratio of the brightness of each pixel of the image extracted currently to the brightness of each pixel of the image extracted last (called a brightness ratio) for each pixel, and calculates the average value and the variance thereof. Then, the commander 10a determines whether or not the calculated average value and variance is equal to or less than the set threshold value (step S63). If the number of projectors that display images is reduced for a period from the last process to the current process, the brightness of the image displayed in the display region 4 is reduced at the same rate on the whole. For this reason, the variance of the brightness rate of each pixel becomes smaller than the same variance calculated when the displayed image is changed. In the display system, the average value and the variance of the brightness ratio of each pixel are calculated in advance by performing a test to stop one projector during the stack display, and each threshold value is set on the basis of the values.

When the determination in step S63 is NO, the commander 10a performs the process of step S61. That is, while the determination in step S63 is NO, the commander 10a repeatedly performs the process of steps S61 to S63. In addition, in step S63, when there is no value calculated last (that is, this is a first time), the commander 10a performs determination as NO. When the determination in step S63 is YES, the commander 10a displays an OSD image, which shows that an error has occurred in a certain projector, for a certain period of time (step S64), and ends this operation. In this manner, the commander 10a can detect the presence of an error on the basis of the image captured by the imaging unit 190. In the display system, using this detection result, it is also possible to determine whether the detection result by the mutual notification process is based on the second type of error or based on the third type of error.

Figure 17:
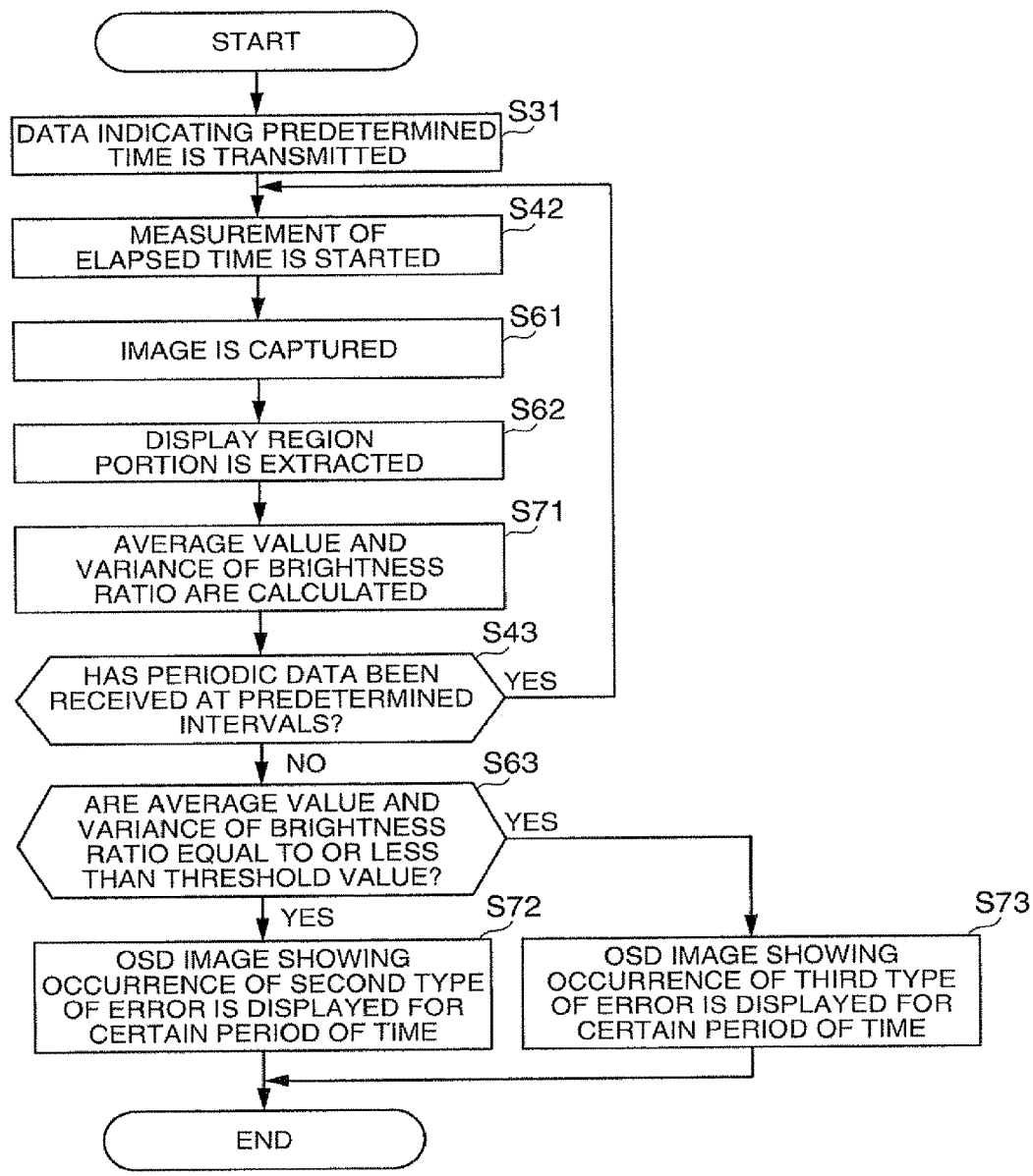
FIG. 17 is a view showing an operation of determining the detection result by the mutual notification process.

FIG. 17 is a flow chart showing an example of the operation to determine a detection result by the mutual notification process. First, the commander 10a performs the process of steps S31 and S42 shown in FIG. 8. Then, the commander 10a performs the process of steps S61 and S62 shown in FIG. 16. Then, the commander 10a calculates the average value and the variance as in step S63 using the brightness of the image extracted in step S62 and the brightness of the image extracted last (step S71). Then, the commander 10a performs the process of step S43, and performs the process of step S63 when the determination is NO. Then, the commander 10a displays an OSD image showing the occurrence of the second type of error for a certain period of time when the determination is YES (step S72), and displays an OSD image showing the occurrence of the third type of error for a certain period of time when the determination is NO (step S73). The commander 10a performs the above-described determination by performing the process of step S63 as shown in FIG. 17.

In the display system, there is a case where control unit failure or a hang-up occurs in a slave and accordingly periodic data is not transmitted to the slave and a case where the transmitted periodic data does not reach a commander due to a communication error. That is, there is a case where the second type of error occurs and a case where the third type of error occurs. When the second type of error occurs, the brightness of an image displayed in the display region 4 is reduced since the slave stops the display of the image. When the third type of error occurs, the brightness of an image displayed in the display region 4 is not changed since the slave displays the image continuously. By performing the operation shown in FIG. 17, the commander 10a can notify of the type of caused error more accurately compared with a case where the detection of an error using a captured image is not performed. In addition, this process may also be applied in the display system shown in FIG. 13A. In this case, when an error occurs in a slave that relays communication, communication between other two devices is not possible either. In this case, it is possible to determine, from the value of the degree of reduction in brightness based on the captured image (for example, brightness ratio), whether the number of projectors that have stopped the display of an image is 1 or 2. In addition, although the commander 10a including an imaging unit has been described as an example in this modification example, the slave 20 may be made to include the imaging unit to perform the same operation.

Fifth Modification Example

Although the slave 20 transmits data at a timing occurring at intervals of a predetermined time (periodic data transmission timing) in the mutual notification process in the embodiment described above, the data transmission timing may not be periodic. For example, the slave 20 transmits data to the commander 10 once every 10 seconds immediately after the stack display is started, and transmits data once a second after 30 minutes by shortening the interval with the passage of time. In this manner, the processing load of the control unit is reduced by reducing the frequency of communication for a period during which a possibility of the occurrence of an error is relatively low before the temperature inside the projector rises. On the other hand, as the temperature rises and accordingly a possibility of the occurrence of an error increases, the frequency of communication is increased so that the time elapsed until an error is detected after the error occurs is shortened. In addition, the slave 20 may be made to increase the frequency of communication as the temperature inside the slave 20 rises, for example. Therefore, the slave 20 can attempt to detect an error depending on the surrounding circumstances.

Also in this modification example, the commander 10 detects that an error has occurred in the slave 20 when the commander 10 has not received data at a timing corresponding to the data transmission timing of the slave 20. In addition, the slave 20 may be configured such that the data transmitted last indicates the next data transmission timing. For example, this data indicates the interval of time between the next transmission and the current transmission or indicates the next transmission time. In this case, the commander 10 detects that an error has occurred in the slave 20 when the commander 10 has not received the next data at a timing set on the basis of the time interval or time indicated by the received data. In short, it is preferable that the commander 10 and the slave 20 set the data receiving timing according to the timing of the transmission of data with respect to each other in the mutual notification process.

Sixth Modification Example

In the display system, in the embodiment described above, the slave 20 transmits periodic data and the commander 10 transmits response data as shown in FIG. 7 and the like. However, the invention is not limited to this. That is, the commander 10 may transmit periodic data and the slave 20 may transmit response data. In this case, the slave 20 performs the process shown in FIG. 8, and the commander 10 performs the process shown in FIG. 10. In addition, both the commander 10 and the slave 20 may transmit data (for example, periodic data) to each other, receive response data that answers the transmitted data, and detect an error. For example, as described in the fifth modification example, when the next transmission timing is indicated by the transmitted data, the mutual notification process can be performed only at the timing set by the projector on the other party. In such a case, the host device also transmits data to make the device on the other party response so that the mutual notification process is performed at the timing set by the host device. Accordingly, the detection of an error in the device on the other party can be attempted.

As described above, both the commander 10 and the slave 20 are examples of other projection type display devices and the first and second projection type display devices, and the display units 101 and 201 shown in FIG. 4 are examples of first and second display units and a display unit. In addition, both the signal transmission units 102 and 202 are examples of first and second signal transmission units, and both the signal receiving units 103 and 203 are examples of first and second signal receiving units. In addition, both the detection units 104 and 204 are examples of first and second detection units, and both the display control units 105 and 205 are examples of first and second display control units.

Seventh Modification Example

The commander 10 and the slave 20 may perform the error notification process and the mutual notification process described above only for a period during which the stack display is performed (hereinafter, referred to as a "stack display period"). In this case, when the display of an image starts and ends, the display unit 101 shown in FIG. 4 supplies data indicating the start and the end to the detection unit 104. When performing the above-described detection, the detection unit 104 determines whether or not the display unit 101 performs display on the basis of the data supplied last from the display unit 101. In addition, the detection unit 104 determines whether or not the stack display mode is set with reference to the mode setting data stored in the storage unit 120. Then, when the stack display mode is set and the display unit 101 performs display, the detection unit 104 performs the above-described detection. Otherwise, the detection unit 104 does not perform the above-described detection. The display unit 201 and the detection unit 204 operate in the same manner as the display unit 101 and the detection unit 104, respectively. Accordingly, even if an error occurs in one device for a period during which image display is not performed in a stack display mode, an OSD image showing the error is not displayed by the other device. In this case, when the power of both projectors is on but an image is displayed on only one of the projectors used by the user, an error that has occurred in the other projector is not displayed. For this reason, it is prevented that an OSD image is displayed on the image displayed by the projector, which is actually used and in which no error has occurred, and accordingly the image that the user wants to see is hidden.

Eighth Modification Example

Although the commander and the slave are connected to each other through the communication line 30 to perform cable communication in the embodiment or the modification examples described above, radio communication may be performed. In this case, each of these projectors includes a unit that performs communication on the basis of the Bluetooth (registered trademark) specification, for example, so that radio communication is performed through this unit.

Ninth Modification Example

The invention may be regarded not only as a projection type display device (projector), such as the commander 10 or the slave 20, or the display system 1 including these projection type display devices but also as a method for realizing the process performed by these projection type display devices. The process referred to herein is each process shown in FIGS. 5, 7, 8, 10, 16, and 17, for example.

The entire disclosure of Japanese Patent Application No. 2012-75872, filed Mar. 29, 2012 is expressly incorporated by reference herein.

What is claimed is:

1. A projection type display device comprising:
   a first display unit that projects and displays an image;
   a first signal receiving unit that receives transmission data transmitted from another projection type display device that projects and displays an image, the another projection type display device having a measuring unit that measures a temperature of a first location inside the another type display device;
   a first detection unit that detects an error in the other projection type display device on the basis of receiving conditions of the transmission data in the first signal receiving unit; and
   a first display control unit that, when the error is detected by the first detection unit, makes the first display unit display a first image showing that the error has been detected
   wherein a frequency of transmitting the transmission data increases as the temperature of the first location increases.

2. The projection type display device according to claim 1,
   wherein when an error occurs in the other projection type display device, the first signal receiving unit receives error data, which indicates that the error has occurred and which is transmitted from the other projection type display device, as the transmission data, and the first detection unit detects the error when the first signal receiving unit receives the error data.

3. The projection type display device according to claim 1, wherein the first signal receiving unit receives first data, which is transmitted from the other projection type display device at a first timing, as the transmission data, and the first detection unit detects the error when the first signal receiving unit does not receive the first data at a second timing corresponding to the first timing.

4. The projection type display device according to claim 2, wherein the first signal receiving unit receives first data, which is transmitted from the other projection type display device at a first timing, as the transmission data, and the first detection unit detects the error when the first signal receiving unit does not receive the first data at a second timing corresponding to the first timing.

5. The projection type display device according to claim 1, further comprising:

a first signal transmission unit that transmits second data to the other projection type display device at a third timing, wherein the first signal receiving unit receives, as the transmission data, third data that the other projection type display device transmits in response to reception of the second data transmitted from the first signal transmission unit, and the first detection unit detects the error when the first signal receiving unit does not receive the third data at a fourth timing corresponding to the third timing.

6. The projection type display device according to claim 2, further comprising:

a first signal transmission unit that transmits second data to the other projection type display device at a third timing, wherein the first signal receiving unit receives, as the transmission data, third data that the other projection type display device transmits in response to reception of the second data transmitted from the first signal transmission unit, and the first detection unit detects the error when the first signal receiving unit does not receive the third data at a fourth timing corresponding to the third timing.

7. The projection type display device according to claim 4, wherein the first detection unit detects the error in a first case where the first signal receiving unit does not receive the first data at the second timing corresponding to the first timing and a second case where the first signal receiving unit receives the error data, and the first display control unit makes the first display unit display different images as the first image in the first and second cases.

8. The projection type display device according to claim 6, further comprising:

a first signal transmission unit that transmits second data to the other projection type display device at a third timing, wherein the first detection unit detects the error in a first case where the first signal receiving unit does not receive the third data at a fourth timing corresponding to the third timing and a second case where the first signal receiving unit receives the error data, and the first display control unit makes the first display unit display different images as the first image in the first and second cases.

9. The projection type display device according to claim 1, wherein the first detection unit detects the error, and the first display unit and the other projection type display device display the images so as to overlap each other.

10. The projection type display device according to claim 1, further comprising:

a first signal transmission unit that, when an error occurs in the projection type display device, transmits error data indicating that the error has occurred to the other projection type display device.

11. The projection type display device according to claim 1, further comprising:

a first signal transmission unit that transmits first data to the other projection type display device at a first timing.

12. The projection type display device according to claim 1, wherein the first signal receiving unit receives second data transmitted from the other projection type display device at a third timing, and a first signal transmission unit that transmits third data to the other projection type display device in response to reception of the second data of the first signal receiving unit is provided.

13. A display system comprising:

a first projection type display device; and a second projection type display device as another projection type display device, wherein the first projection type display device includes:

a first display unit that projects and displays an image;

a first signal receiving unit that receives transmission data transmitted from another projection type display device that projects and displays an image;

a first detection unit that detects an error in the other projection type display device on the basis of receiving conditions of the transmission data in the first signal receiving unit; and a first display control unit that, when the error is detected by the first detection unit, makes the first display unit display a first image showing that the error has been detected, and the second projection type display device includes:

a second display unit that projects and displays an image;

a measuring unit that measures a temperature of a first location inside the second projection type display device; and a second signal transmission unit that transmits the transmission data to the first projection type display device wherein a frequency of transmitting the transmission data increases as the temperature of the first location increases.

14. The display system according to claim 13, wherein the second projection type display device further includes:

a second detection unit that detects an error in the first projection type display device on the basis of receiving conditions of data from the first projection type display device in the second signal receiving unit; and a second display control unit that, when the error is detected by the second detection unit, makes the second display unit display a second image, which shows that the error has been detected, at a position not overlapping the first image.

15. The display system according to claim 14,
wherein the first projection type display device further includes a first signal transmission unit that transmits second data to the second projection type display device at a third timing, the second projection type display device further includes a second signal receiving unit that receives the second data transmitted from the first projection type display device at the third timing, the second transmission unit transmits the third data to the first projection type display device as the transmission data in response to reception of the second data of the second signal receiving unit, the first signal receiving unit receives third data as the transmission data from the second projection type display device, and the first detection unit detects the error when the first signal receiving unit does not receive the third data at a fourth timing corresponding to the third timing.

16. The display system according to claim 14,
wherein the first detection unit detects an error in the second projection type display device when the first and second display units display images so as to overlap each other, and the second detection unit detects an error in the first projection type display device when the first and second display units display images so as to overlap each other.

17. A display method comprising:

making a first projection type display device, which includes a display unit that projects and displays an image and a signal receiving unit that receives transmission data transmitted from another projection type display device that projects and displays an image, detect an error in the other projection type display device on the basis of receiving conditions of the transmission data in the signal receiving unit; and when an error is detected in the detection, making the display unit display an image, which shows that the error has been detected, on the display unit by the first projection type display device, wherein the another projection type display device has a measuring unit that measures a temperature of a first location inside the second projection type display device and a frequency of transmitting the transmission data increases as the temperature of the first location increases.

* * * * *